Figure 1:
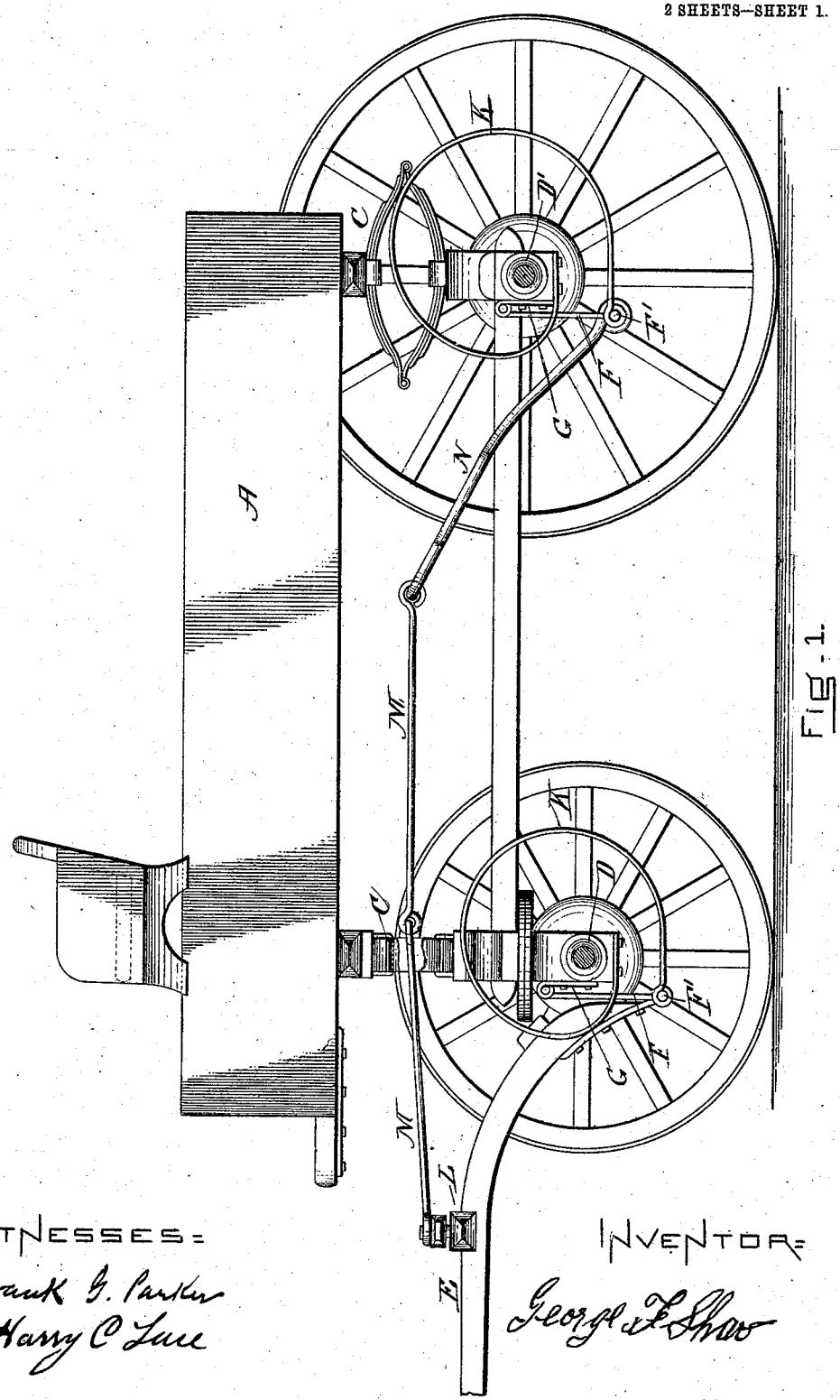

No. 854,967. PATENTED MAY 28, 1907.
G. F. SHAW.
DRAFT DEVICE FOR WAGONS.
APPLICATION FILED JULY 6, 1906.

2 SHEETS—SHEET 1.

WITNESSES:
Frank G. Parker
Harry C. Lane

INVENTOR:
George F. Shaw

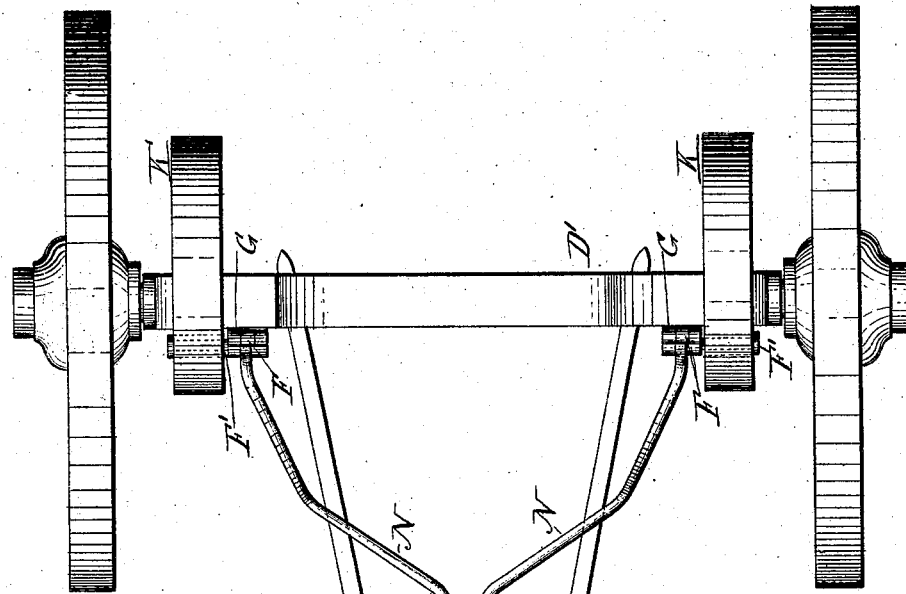
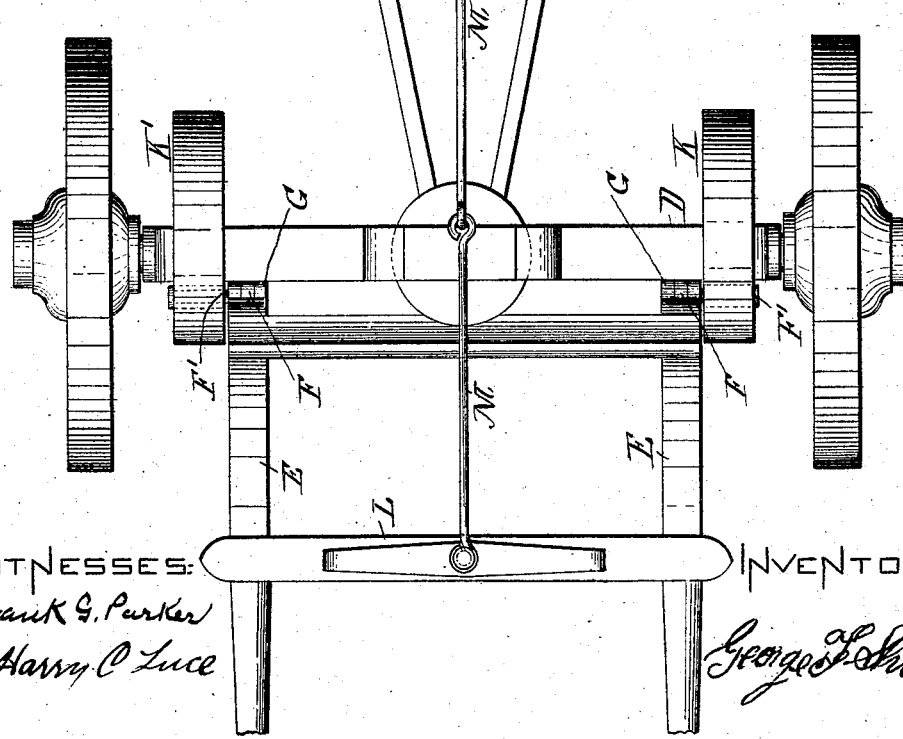

UNITED STATES PATENT OFFICE.

GEORGE F. SHAW, OF DEDHAM, MASSACHUSETTS.

DRAFT DEVICE FOR WAGONS.

No. 854,967.  Specification of Letters Patent.  Patented May 28, 1907.

Application filed July 6, 1906. Serial No. 325,031.

*To all whom it may concern:*

Be it known that I, GEORGE F. SHAW, a citizen of the United States, of Dedham, in the county of Norfolk and State of Massachusetts, have invented a new and useful Improvement in a Draft Device for Wagons, of which the following, taken in connection with the accompanying drawings, is a specification.

My invention relates to a device for connecting the draft animals to the vehicle to be drawn, and consists of a peculiar mechanism which connects the thills or pole to the axletree and which may be best understood by reference to the drawings and specification.

The object is to relieve the draft animals from undue strain and to render the work of the said animals easier and less irregular. This object I attain by the means illustrated in the accompanying drawings, in which—

Figure 1 is an elevation showing an ordinary wagon having my draft attachment, one of the front and one of the side wheels being omitted. Fig. 2 is a plan view showing the running gear and connections.

The drawings show the invention in connection with a vehicle of the express-wagon type but the improvement may be applied equally well to any ordinary carriage or wagon. The body of the wagon is indicated by A and its springs by C C, the axletrees D and D¹ and the wheels may be of any ordinary construction and need not be more fully described.

The parts that I consider new and of peculiar advantage relate to the draft mechanism and the parts connected thereto. I will now describe those parts:

The thills E E are not connected directly to the front axletree, but to the lower ends of swinging hangers F F to which each is connected by a pivot rod F¹, the upper ends of these swinging hangers F F are pivoted to bracket-pieces G G which in turn are rigidly attached to the forward axletree D. The pivot rods F¹ extend horizontally and outwardly and engage with volute springs K K¹, the other ends of the said volute springs being fastened to the axletree D so that any strain on the thills E E by the draft animals will be first exerted on the lower ends of the swinging hangers F F, thence through the pivot rods F¹ F¹ to the free ends of the volute springs K K¹ and through them to the forward axletree D. This method of connecting the draft animals to the load has a twofold advantage over the ordinary method; thus the strain exerted by the animals is first exerted upon yielding parts, viz.: the ends of the volute springs K K¹, thence the strain is gradually increased until the full force is transmitted from the animals, thereby freeing the animals from abrupt strains and making their work much less wearing to them. The second advantage is that by making the thill connection at a point well below the center of gravity of the load the pull (diagonally upward) of the animals will, acting through the swinging hangers F F and the volute springs, have a tendency to lift the load and thus lessen the downward force and allow the load to be drawn over any obstructions much more easily.

The rear axletree D¹ has the same kind of swinging hangers and volute springs as those of the forward axletree, and by connecting the cross-bar L of the thills to the lower ends of the said swinging hangers by the draw-rod M N N the same action is attained for the rear wheels that the forward wheels have.

Claims.

1. A draft device for wagons, comprising thills or poles; a front axle having brackets and swinging hangers to which the said thills or poles are pivotally attached by pivot rods; volute springs, each connected by one of its ends to the said pivot rods, and thereby to the said thills or poles; the other ends of the said volute springs are made fast to the said front axle; substantially as and for the purpose set forth.

2. A draft device for wagons, comprising thills or poles; a rear axle having brackets and swinging hangers; a draft rod connecting the said thills or poles to the said swinging hangers by means of pivot rods; volute springs, each connected by one of its ends to the said pivot rods, and thereby to the said thills or poles; the other ends of the said volute springs are made fast to the said rear axle; substantially as and for the purpose set forth.

In testimony whereof, I have signed my name to this specification in the presence of two subscribing witnesses, on this 2nd day of July A. D. 1906.

GEORGE F. SHAW.

Witnesses:
 FRANK G. PARKER,
 HARRY C. LUCE.